(12) United States Patent
Zeller

(10) Patent No.: US 8,790,732 B2
(45) Date of Patent: *Jul. 29, 2014

(54) NON CARBOHYDRATE FOAMING COMPOSITIONS AND METHODS OF MAKING THE SAME

(71) Applicant: Kraft Foods Global Brands LLC, Northfield, IL (US)

(72) Inventor: Bary Lyn Zeller, Glenview, IL (US)

(73) Assignee: Intercontinental Great Brands LLC, East Hanover, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/693,699

(22) Filed: Dec. 4, 2012

(65) Prior Publication Data

US 2013/0122175 A1    May 16, 2013

Related U.S. Application Data

(63) Continuation of application No. 13/019,458, filed on Feb. 2, 2011, now Pat. No. 8,323,719, which is a continuation of application No. 10/919,472, filed on Aug. 17, 2004, now abandoned.

(51) Int. Cl.
*A23L 1/0562* (2006.01)

(52) U.S. Cl.
USPC ........... 426/576; 426/334; 426/470; 426/477; 426/564; 426/580; 426/591; 426/594; 426/597

(58) Field of Classification Search
USPC ......... 426/334, 470, 477, 564, 569, 580, 591, 426/594, 597
See application file for complete search history.

*Primary Examiner* — Helen F Heggestad
(74) *Attorney, Agent, or Firm* — Stephen J. Weyer, Esq.; Marvin Petry, Esq.; Stites & Harbison, PLLC.

(57) ABSTRACT

A foaming composition includes a powdered carbohydrate-free soluble composition which includes protein particles having a plurality of internal voids containing entrapped pressurized gas. In one form, the foaming composition is produced by subjecting the particles to an external gas pressure exceeding atmospheric pressure prior to or while heating the particles to a temperature of at least the glass transition temperature and then cooling the particles to a temperature below the glass transition temperature prior to or while releasing the external pressure in a manner effective to trap the pressurized gas within the internal voids.

15 Claims, No Drawings

NON CARBOHYDRATE FOAMING COMPOSITIONS AND METHODS OF MAKING THE SAME

CROSS-REFERENCE TO RELATED APPLICATIONS

This is a continuation of U.S. patent application Ser. No. 13/019,458, filed Feb. 2, 2011; now issued as U.S. Pat. No. 8,323,719, which is a continuation of U.S. patent application Ser. No. 10/919,472, filed Aug. 17, 2004, now abandoned, all herein incorporated by reference.

FIELD OF THE INVENTION

The present invention relates to soluble foaming compositions, and in particular, carbohydrate-free foaming protein compositions which contain pressurized gas.

BACKGROUND OF THE INVENTION

Some conventionally prepared food items include froth or foam. For example, cappuccino, milk shakes, and some soups may have froth or foam. While conventionally prepared food items may be considered preferable by some consumers, other consumers are increasingly demanding the convenience of consumer prepared instant food alternatives. In order to accommodate consumer preferences, manufactures have developed instant food products which give consumers the food products they demand from a convenient instant food product by developing instant food items which have the same or similar characteristics as conventionally prepared food items. One challenge for manufacturers is how to produce a food product having froth or foam from an instant food item.

One prior solution used to manufacture an instant food product which has froth or foam is through the use of powdered foaming compositions which produce foam upon reconstitution in a liquid. Foaming powder compositions have been used to impart froth or foamed texture to a wide variety of foods and beverages. For example, foaming compositions have been used to impart froth or foamed texture to instant cappuccino and other coffee mixes, instant refreshing beverage mixes, instant soup mixes, instant milkshake mixes, instant dessert toppings, instant sauces, hot or cold cereals, and the like, when combined with water, milk, or other suitable liquid.

Some examples of gas-injected foaming creamers which can be used to impart foam or froth are disclosed in U.S. Pat. No. 4,438,147 and in EP 0 458 310. More recently, U.S. Pat. No. 6,129,943 discloses a foaming creamer produced by combining a gasified carbohydrate with protein and lipid. Using this technology, it was possible to eliminate gas injection of the liquid creamer composition prior to spray drying.

EP 0 813 815 B1 discloses a foaming creamer composition which is either a gas-injected foaming creamer or a creamer containing chemical carbonation ingredients which contains in excess of 20% protein by weight. The powder described has as essential ingredients, protein, lipid and filler material, the filler especially being a water-soluble carbohydrate. The high content of protein is needed to obtain a whipped cream-like, tight foam having spoonability.

One prior foaming composition is provided by U.S. Pat. No. 6,713,113 which discloses a powdered soluble foaming ingredient comprised of a matrix containing carbohydrate, protein, and entrapped pressurized gas. However, powdered ingredients containing both carbohydrate and protein are susceptible to nonoxidative browning reactions that can adversely affect the appearance, flavor, and shelf life of packaged food products. These complex chemical reactions occur between proteins and carbohydrates, especially reducing sugars, to form polymeric pigments that can severely discolor and diminish the flavor quality of food products. It has been discovered that highly effective foaming compositions containing entrapped pressurized gas can be manufactured without the need to use both carbohydrate and protein ingredients. Browning can occur very rapidly at high temperatures commonly used in food processing and susceptibility to browning can limit the range of heating conditions used to produce foaming compositions of the type disclosed in the aforementioned prior art.

A possible solution could be the use of a substantially protein-only composition, as described in WO-A-2004/019699. However, the use of protein itself also poses some problems. More importantly, none of the disclosed examples in the published patent application are devoid of carbohydrate.

U.S. Pat. No. 6,168,819 describes a particulate creamer comprising protein, lipid, and carrier, in which more than 50% by weight of the protein is partially denatured whey protein, the partially denatured whey protein being from 40 to 90% denatured. The total protein content of the creamer is between 3 and 30% by weight, preferably between 10 and 15% by weight. The creamer is particularly suitable for foaming creamer compositions. The foaming creamer composition, when added to a brewed hot coffee beverage, produces a large amount of creamy semi-solid foam.

U.S. Pat. No. 6,174,557 describes an instant particulate dry mix composition that produces a cappuccino beverage having surface foam with a marbled appearance upon reconstitution in water. The dry mix composition is made by deaerating and subsequently freeze drying a coffee extract to produce granules having an outer surface layer which is rapidly soluble and a larger inner core layer which is slowly soluble. The product has a density of at least 0.3 g/cc.

U.S. Pat. No. 6,953,592 discloses a method for forming tablets or powders of carbohydrate-based pharmaceuticals or foods which includes subjecting tablets or powders which comprise a beverage base such as soluble coffee, foamed powder, sugar and creamer to pressure and temperature to produce a tablet or powder with increased solubility or dispersability on contact with water. In addition, a method is disclosed which promotes the dissolution or dispersion of a tablet or non-foaming powder by subjecting the tablet or powder to pressurized gas so that gas is entrapped therein to promote dissolution or dispersion of the tablet or powder on contact with water. It is notable that all examples provided therein of soluble compositions are powder or tablet compositions containing carbohydrate. Improved dissolution of tablets containing entrapped gas is demonstrated in working examples therein. However, improved dissolution or dispersability of powders, foaming or non-foaming, containing entrapped gas is not demonstrated in any working example therein. More importantly, this reference does not disclose a soluble composition containing pressurized gas nor a method for manufacturing a soluble composition containing pressurized gas.

A disadvantage of prior foaming additives, as well as of many prior products, is that both proteins and carbohydrates are present. More importantly, even art directed to forming substantially protein-only compositions, such as WO-A-2004/019699, fail to disclose a working example devoid of carbohydrate. In fact, none of the relevant prior art discloses a working example or any reduction to practice of a foaming protein composition devoid of carbohydrate. The foaming composition of WO-A-2004/019699 that forms the basis of all working examples disclosed therein contains carbohydrate glycerol at a level of 5% by weight. In fact, none of the relevant prior art discloses a working example or any reduction to practice of a foaming carbohydrate composition devoid of protein.

Proteins can react with carbohydrates, especially when heated. Most of the time these (Maillard) reactions lead to undesired coloring and/or formation of off-flavor. This type of reaction generally occurs during processing or manufacturing, when the product is kept at higher temperatures for some time and often if it is kept at higher temperatures for prolonged times. In most of the preparation processes for the products described in the documents discussed herein-above, and particularly in the preparation processes described in U.S. Pat. No. 6,168,819, a prolonged time at elevated temperatures is used to gasify the powders.

Further, since prior foaming coffee additives include both a carbohydrate component and a protein component, people on restrictive diets wishing to avoid one of the two components will not be able to consume beverages including any of the prior additives.

Although foaming coffee additives are available, there is still a need for a powdered carbohydrate-free soluble foaming composition which, upon reconstitution, exhibits a foam characteristic desired by true cappuccino beverage connoisseurs. For example, prior resulting cappuccino beverages containing foaming additives lack sufficient foam, the foam dissipates too quickly or there is a combination of both. In addition, none of the relevant prior art discloses a working example or any reduction to practice of a foaming protein composition devoid of carbohydrate.

SUMMARY OF THE INVENTION

The present invention relates to a non-carbohydrate, i.e., carbohydrate-free foaming composition which provides excellent resistance to browning and can provide additional advantages. For example, the carbohydrate-free foaming composition can support low-carbohydrate diets. In addition, the improved foaming composition can be used in a wide variety of hot and cold beverage mixes and other instant food products to provide froth or foamed texture.

The present invention, in one form thereof, concerns a foaming composition which comprises a powdered carbohydrate-free soluble composition comprising protein particles having a plurality of internal voids containing entrapped pressurized gas. In further alternate forms, the soluble composition releases at least about 2 cc or at least about 5 cc of gas per gram of the composition when dissolved in a liquid, and the soluble composition is selected from the group comprising a milk protein, soy protein, egg protein, gelatin, collagen, whey protein, and mixtures thereof. In yet a further form, the composition may include a buffering agent such as a salt of an organic or inorganic acid.

The present invention in another form thereof concerns a foaming composition which comprises carbohydrate-free soluble foaming particles comprising an essentially 100% protein on a dry weight basis and having a plurality of internal voids containing entrapped pressurized gas. The foaming composition is formed by subjecting the particles to an external gas pressure exceeding atmospheric pressure prior to or while heating the particles to a temperature of at least the glass transition temperature ($T_g$) and then cooling the particles to a temperature below the $T_g$ prior to or while releasing the external gas pressure in a manner effective to trap the pressurized gas within the internal voids.

The present invention in another form thereof concerns a soluble consumable food product comprising a carbohydrate-free soluble foaming composition which comprises protein particles having a plurality of internal voids containing entrapped pressurized gas. In various further forms, the soluble food product may include a beverage mix such as coffee, cocoa, or tea, such as instant coffee, cocoa or tea, or the soluble consumable product may include an instant food product such as an instant dessert product, instant cheese product, instant cereal product, instant soup product, and an instant topping product.

The present invention in yet another form thereof concerns a method for manufacturing a foaming composition in which the method includes heating carbohydrate-free soluble particles which includes a protein which has internal voids. An external pressure exceeding atmospheric pressure is applied to the carbohydrate-free soluble particles. The carbohydrate-free soluble particles are cooled and the external gas pressure is released thereby resulting in pressurized gas remaining in the internal voids. In further alternate forms, the external pressure is applied prior to heating the particles or the external pressure is applied while heating the particles.

DETAILED DESCRIPTION OF THE PREFERRED EMBODIMENTS

Ingredients that can be used to formulate carbohydrate-free powders include proteins, lipids, and other carbohydrate-free substances. Proteins are preferred and include, but are not limited to, milk proteins, soy proteins, egg proteins, gelatin, collagen, wheat proteins, and hydrolyzed proteins. Suitable hydrolyzed proteins include hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, and amino acids. The protein or the mixture of proteins is selected such that the foaming composition structure is sufficiently strong to retain the gas enclosed under pressure.

Hydrolyzed gelatin is preferred because of its superior chemical and physical properties. It not only provides excellent gas entrapment characteristics, foamability, and flavor, but also is completely devoid of carbohydrate, and further, unlike other protein sources listed above, is non-allergenic. As an alternative to hydrolyzed gelatin, gelatin can be used. Accordingly, the use of hydrolyzed gelatin or gelatin can be advantageous to manufacturing foaming compositions containing entrapped pressurized gas.

Food ingredients that are both protein-free and carbohydrate-free can be used in combination with proteins and may include, but are not limited to, organic and inorganic salts, surfactants, emulsifiers, phytochemicals, nutritional additives, flow agents, artificial sweeteners, preservatives, colorants, and some flavors. Lipids include, but are not limited to, fats, oils, hydrogenated oils, interesterified oils, phospholipids, and fatty acids derived from vegetable, dairy, or animal sources, and fractions or mixture thereof. The lipid may also be selected from waxes, sterols, stanols, terpenes, and fractions or mixture thereof. Examples of possible emulsifiers include an emulsifier selected from the group consisting of Tween 20 (polyoxyethylene sorbitanmonolaureate), SSL (sodium stearoyl-2-lactylate) or sucrose ester.

The powdered soluble carbohydrate-free foaming ingredients of this invention can be produced by any method effective to provide a particulate structure having a plurality of internal voids capable of entrapping pressurized gas. Conventional gas-injected spray drying of aqueous solutions is the preferred method to manufacture these powdered soluble foaming compositions, but gas-injected extrusion of powder melts is also a suitable method. Spray drying without gas injection typically produces particles having relatively small internal void volumes, but this less preferred method can also be used to manufacture carbohydrate-free foaming compositions having suitable internal void volumes. Nitrogen gas is preferred, but any other food-grade gas can be used for gas injection, including air, carbon dioxide, nitrous oxide, or mixture thereof.

The term "entrapped pressurized gas" means that gas having a pressure greater than atmospheric pressure is present in the foaming composition structure and is not able to leave this structure, without opening the powder structure. Preferably, the majority of the pressurized gas present in the foaming composition structure is contained physically within internal voids of the powder structure. Gases that can suitably be used according to the present invention can be selected from nitrogen, carbon dioxide, nitrous oxide, air, or mixture thereof. Nitrogen is preferred, but any other food-grade gas can be used to entrap pressurized gas in the powder structure.

The term "structure," "particulate structure," "particle structure," or "powder structure" means the structure contains a large number of sealed internal voids which are closed to the atmosphere. These voids are capable of holding a large volume of entrapped pressurized gas that is released as bubbles upon dissolution of the structure in liquid to produce foam.

The term "powdered soluble foaming composition," "powdered foaming composition," or "foaming composition" means any powder that is soluble in, or disintegrates in a liquid, and especially in an aqueous liquid, and that upon contact with such liquid forms a foam or froth.

The term "carbohydrate-free" or "non-carbohydrate" means to convey intentional and deliberate avoidance of substances containing any significant amount of carbohydrate, to the greatest practical extent, in the formulation of foaming compositions. Accordingly, the carbohydrate-free foaming compositions of this invention are virtually free or devoid of carbohydrate and contain substantially less than 1%, and typically less than about 0.5%, carbohydrate. Preferred carbohydrate-free compositions of this invention are completely devoid of carbohydrate. The hydrolyzed gelatin foaming compositions disclosed in the examples herein are completely devoid of carbohydrate, and thus 100% protein.

Weight percentages are based on the weight of the final powdered foaming composition, unless otherwise indicated.

The term "emulsifier" means any surface-active compound that has oil or gas emulsifying properties which is compatible with the end use of the powder of the invention, has emulsifying properties and is not a protein.

The term "essentially 100% protein" used in reference to the non-carbohydrate protein foaming composition means that the composition is essentially all protein with only trace amounts of non-protein constituents being less than 1% on a dry basis.

The term "100% protein" means that the composition comprises no carbohydrate, i.e. is completely devoid of carbohydrate.

With regard to both "essentially 100% protein" and "100% protein," there may be residual moisture.

The foaming composition may have a moisture content between 0-15%, typically 1-10%, more typically 2-5% and water activity between 0-0.5, typically 0.05-0.4, and more typically 0.1-0.3. However, both the "essentially 100% protein" and "100% protein" compositions are completely devoid of carbohydrates.

Advantages of the foaming composition according to the invention are that, upon contact with a suitable liquid, an amount of foam is formed which provides desirable color, mouthfeel, density, texture, and stability when used to formulate instant cappuccino mixes or other products. Since it contains no carbohydrate, adverse side effects associated with protein/carbohydrate mixtures, such as Maillard reaction, and/or reactions between proteins and other substituents, do not occur or at least are reduced.

It is optional to formulate the foaming ingredient compositions of this invention using one or more surfactants to improve bubble formation and creation of internal voids during spray drying or extrusion. Use of suitable surfactants at appropriate levels can be used to influence the relative size, number, and volume of internal voids available for entrapping gas. Because most food proteins are naturally surface-active, suitable carbohydrate-free compositions containing protein can be manufactured with adequate internal void volumes without the need for surfactants. Surfactants include food-approved emulsifying agents such as polysorbates, sucrose esters, stearoyl lactylates, mono/di-glycerides, diacetyl tartaric esters of mono/di-glycerides, and phospholipids.

Formulation of protein-based carbohydrate-free foaming compositions of this invention using one or more buffering agents can be used to facilitate spray drying and reconstitution in liquid. Preferred buffering agents used in this invention are salts of organic or inorganic acids. Buffering agents increase the buffering capacity of proteins in the foaming composition to improve resistance to aggregation or denaturation in certain product applications such as acidic beverages. The most preferred buffering agents are sodium and potassium salts of organic acids. Suitable buffering agents include, but are not limited to, sodium, potassium, calcium, and magnesium salts of citric, malic, fumaric, and phosphoric acid.

Powders which are used for entrapping pressurized gas to manufacture the foaming compositions of this invention have a bulk and tap density in the range of 0.1-0.7 g/cc, typically 0.2-0.6 g/cc, a skeletal density in the range of 0.3-1.6 g/cc, typically 0.4-1.5 g/cc, a true density of 1.2-1.6 g/cc, and an internal void volume in the range of 5-80%, typically 10-75%, before subjecting to external gas pressure. Powders with relatively large internal void volumes are generally preferred because of their greater capacity to entrap gas. Internal void volume is suitably at least about 10%, preferably at least about 30%, and more preferably at least about 50%. The powders have a glass transition temperature between 30-150° C., typically 40-125° C., and more typically 50-100° C. The powders have a moisture content between 0-15%, typically 1-10%, more typically 2-5% and water activity between 0-0.5, typically 0.05-0.4, and more typically 0.1-0.3.

Bulk density (g/cc) is determined by measuring the volume (cc) that a given weight (g) of material occupies when poured through a funnel into a graduated cylinder. Tap density (g/cc) is determined by pouring the powder into a graduated cylinder, vibrating the cylinder until the powder settles to its lowest volume, recording the volume, weighing the powder, and dividing weight by volume. Skeletal density (g/cc) is determined by measuring the volume of a weighed amount of powder using a helium pycnometer (Micromeritics AccuPyc 1330) and dividing weight by volume. Skeletal density is a measure of density that includes the volume of any voids present in the particles that are sealed to the atmosphere and excludes the interstitial volume between particles and the volume of any voids present in the particles that are open to the atmosphere. The volume of sealed voids, referred to herein as internal voids, is derived from also measuring the skeletal density of the powder after grinding with mortar and pestle to remove or open all internal voids to the atmosphere. This type of skeletal density, referred to herein as true density (g/cc), is the actual density of only the solid matter comprising the powder. Internal void volume (%), the volume percent of sealed internal voids contained in the particles comprising the powder, is determined by subtracting the reciprocal true density (cc/g) from the reciprocal skeletal density (cc/g) and then multiplying the difference by skeletal density (g/cc) and 100%.

The glass transition temperature marks a secondary phase change characterized by transformation of the powder composition from a rigid glassy state to a softened rubbery state. In general, gas solubilities and diffusion rates are higher in materials at or above the glass transition temperature. The glass transition temperature is dependent on chemical composition and moisture level and, in general, lower average molecular weight and/or higher moisture will lower glass transition temperature. The glass transition temperature can intentionally be raised or lowered by simply decreasing or increasing, respectively, the moisture content of the powder using any suitable method known to one skilled in the art. Glass transition temperature can be measured using established Differential Scanning calorimetry or Thermal Mechanical Analysis techniques.

Novel foaming compositions of this invention that contain entrapped pressurized gas can be manufactured by heating the carbohydrate-free powder having appropriate particle structure under pressure in any suitable pressure vessel and cooling the powder either by rapid release of pressure or by cooling the vessel prior to depressurization. The preferred method is to seal the powder in the pressure vessel and pressurize with compressed gas, then heat the pressure vessel either by placing in a preheated oven or bath or by circulation of electric current or hot fluid through an internal coil or external jacket to increase the temperature of the powder to above the glass transition temperature for a period of time effective to fill internal voids in the particles with pressurized gas, then cool the still pressurized vessel containing the powder to about room temperature either by placing in a bath or by circulation of cold fluid, then release the pressure and open the vessel to recover the foaming composition. The foaming composition can be produced in batches or continuously using any suitable means. Novel foaming compositions of this invention that contain atmospheric pressure gas can be produced in the same manner with the exception that heating is conducted below the glass transition temperature of the powder.

In general, powders are heated at a temperature in the range of 20-200° C., preferably 40-175° C., and more preferably 60-150° C. for 1-300 minutes, preferably 5-200 minutes, and more preferably 10-150 minutes. The pressure inside the pressure vessel is in the range of 20-3000 psi, preferably 100-2000 psi, and more preferably 300-1500 psi. Use of nitrogen gas is preferred, but any other food-grade gas can be used to pressurize the vessel, including air, carbon dioxide, nitrous oxide, or mixture thereof. Powder gas content and foaming capacity generally increase with processing pressure. Heating can cause the initial pressure delivered to the pressure vessel to increase considerably. The maximum pressure reached inside the pressure vessel during heating can be approximated by multiplying the initial pressure by the ratio of heating temperature to initial temperature using Kelvin units of temperature. For example, pressurizing the vessel to 1000 psi at 25° C. (298 K) and then heating to 120° C. (393 K) should increase the pressure in the pressure vessel to approximately 1300 psi.

At temperatures at or above the $T_g$, particle gas content and foaming capacity increase with processing time until a maximum is reached. The rate of gasification generally increases with pressure and temperature and relatively high pressures and/or high temperatures can be used to shorten processing time. However, increasing temperature to greatly beyond what is required for effective processing can make the powder susceptible to collapse. Particle size distribution of the powders is typically not meaningfully altered when gasification is conducted under more preferred conditions. However, significant particle agglomeration or caking can occur when gasification is conducted under less preferred conditions such as excessively high temperature and/or long processing time. It is believed that gas dissolved in the softened gas-permeable solid matter during heating diffuses into internal voids until pressure equilibrium is reached or until the powder is cooled to below the $T_g$. Therefore, it is to be expected that the cooled particles should retain both pressurized gas entrapped in internal voids and gas dissolved in the solid matter.

When powders are pressurized at a temperature at or above the $T_g$, it is common for some of the particles to explode with a loud cracking sound during a brief time after depressurization due to bursting of localized regions of the particle structure that are too weak to retain the pressurized gas. In contrast, when powders are pressurized below the $T_g$ and depressurized, it is less common for particles to explode and any explosions occur with less sound and force. However, it is common for these particles to produce a faint popping sound during a brief time after depressurization. Powder appearance and bulk density are typically not significantly altered by pressurizing below the $T_g$, but skeletal density and internal void volume are typically significantly altered.

The foaming compositions retain pressurized gas with good stability when stored below the $T_g$ with adequate protection against moisture intrusion. Foaming compositions stored in a closed container at room temperature generally perform well many months later. Powders pressurized below the $T_g$ do not retain pressurized gas for a long period of time. However, it has been surprisingly discovered that spray-dried powders that are pressurized below the $T_g$ typically produce significantly more froth than the unpressurized powders even after the pressurized gas is lost. It is believed that this beneficial increase in foaming capacity is caused by infiltration of atmospheric pressure gas into previously vacuous internal voids formed by evaporation of water from the particles during drying. It has been found that this novel method to increase the foaming capacity of spray-dried foaming compositions can be conducted at room temperature with excellent results.

Foaming compositions manufactured according to the embodiments of this invention have a bulk density and a tap density in the range of 0.1-0.7 g/cc, typically 0.2-0.6 g/cc, a skeletal density in the range of 0.3-1.6 g/cc, typically 0.5-1.5 g/cc, and more typically 0.7-1.4 g/cc, a true density in the range of 1.2-1.6 g/cc, an internal void volume in the range of 2-80%, typically 10-70%, and more typically 20-60%, and contain pressurized gas in the range of 20-3000 psi, typically 100-2000 psi, and more typically 300-1500 psi. As a point of reference, atmospheric pressure is about 15 psi at sea level. Pressure treatment at any temperature typically increases skeletal density and decreases internal void volume. Bulk density is typically not significantly altered by pressure treatment below the $T_g$, but is typically increased by pressure treatment above the $T_g$. Changes in bulk density, skeletal density, and internal void volume are collectively determined by powder composition and processing conditions including treatment time, temperature, and pressure. The powdered foaming compositions containing entrapped pressurized gas generally have particle size between about 1 to 5000 microns, typically between about 5 to 2000 microns, and more typically between about 10 to 1000 microns.

The preferred use for these novel foaming compositions is in soluble beverage mixes, particularly instant coffee and cappuccino mixes. However, they can be used in any instant food product that is rehydrated with liquid. Although these foaming compositions typically dissolve well in cold liquids to produce froth, dissolution and foaming capacity are generally improved by reconstitution in hot liquids. Applications include instant beverages, desserts, cheese powders, cereals, soups, topping powders, and other products.

The following examples are included to provide better understanding of the present invention but in no way limit the scope or breadth thereof.

EXAMPLE 1

A commercial carbohydrate-free (0.0% carbohydrate) hydrolyzed gelatin powder, produced by spray drying an aqueous solution without gas injection, was obtained. The 99.2% dry-basis protein powder had light yellow color, a bulk density of 0.45 g/cc, a tap density of 0.54 g/cc, a skeletal density of 1.15 g/cc, an internal void volume of 18%, a true density of 1.41 g/cc, a $T_g$ of 70° C., and moisture content of about 6%. The powder was added to an instant cappuccino mix, using a weight ratio of about one part powder to one part soluble coffee to two parts sugar to three parts foaming creamer. Reconstitution of about 13 g of the cappuccino mix in a 250 ml beaker having 65 mm internal diameter using 130 ml of 88° C. produced an amount of froth that completely covered the surface of the beverage to a height of about 14 mm.

6 g of the carbohydrate-free powder was pressurized at 25° C. with nitrogen gas at 1000 psi for 5 minutes in a stainless steel pressure vessel (75 cc capacity gas-sampling cylinder; manufactured by Whitey Corporation; used in all examples herein) and then depressurized. Replacing the untreated powder with an equal weight of treated powder in the cappuccino mix revealed that treatment increased the foaming capacity of the powder by about 150%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 2 cc gas per gram of powder while the treated powder released about 5.5 cc gas per gram of powder. The powder produced a faint popping sound for a short time after depressurization. Bulk density of the treated powder was not altered, but skeletal density increased to 1.24 g/cc and internal void volume decreased to 12%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Another 6 g sample of the carbohydrate-free powder was pressurized with nitrogen gas at 1000 psi, heated in a 120° C. oven for 15 minutes, and then cooled to about room temperature before depressurizing. The treatment trapped pressurized gas in the powder and many particles exploded for a short time after depressurization. The treated powder had light yellow color, a tap density of 0.54 g/cc, a skeletal density of 1.28 g/cc, and an internal void volume of 9%. Replacing the untreated powder with an equal weight of treated powder in the cappuccino mix revealed that treatment increased the foaming capacity of the powder by over 2-fold, increasing the amount of gas released from about 2 cc gas per gram of powder to about 5.5 cc gas per gram of powder.

Another 6 g sample of the carbohydrate-free powder was pressurized with nitrogen gas at 1000 psi, heated in a 120° C. oven for 30 minutes, and then cooled to about room temperature before depressurizing. The treatment trapped pressurized gas in the powder and many particles exploded for a short time after depressurization. The treated powder had light yellow color, a tap density of 0.54 g/cc, a skeletal density of 1.33 g/cc, and an internal void volume of 6%. Replacing the untreated powder with an equal weight of treated powder in the cappuccino mix revealed that treatment increased the foaming capacity of the powder by over 4-fold, increasing the amount of gas released from about 2 cc gas per gram of powder to about 9 cc gas per gram of powder.

Another 6 g sample of the carbohydrate-free powder was pressurized with nitrogen gas at 1000 psi, heated in a 120° C. oven for 60 minutes, and then cooled to about room temperature before depressurizing. The treatment trapped pressurized gas in the powder and a comparably larger proportion of particles exploded for a short time after depressurization. The treated powder had light yellow color, a tap density of 0.52 g/cc, a skeletal density of 1.28 g/cc, and an internal void volume of 9%. Replacing the untreated powder with an equal weight of treated powder in the cappuccino mix revealed that treatment increased the foaming capacity of the powder by 6-fold, increasing the amount of gas released from about 2 cc gas per gram of powder to about 12.5 cc gas per gram of powder. All cappuccino beverages had excellent flavor.

EXAMPLE 2

A commercial carbohydrate-free (about 0.1% residual lactose) hydrolyzed sodium caseinate powder, produced by spray drying an aqueous solution without gas injection, was obtained. The 94.5% dry-basis protein powder had light yellow color, clean milky odor and flavor, a bulk density of 0.27 g/cc, a tap density of 0.45 g/cc, a skeletal density of 1.28 g/cc, an internal void volume of 7%, a true density of 1.37 g/cc, a $T_g$ of 69° C., and moisture content of about 4%. Use of the powder in an instant sweetened coffee mix, using a weight ratio of about three parts powder to one part soluble coffee to two parts sugar, produced an amount of froth that completely covered the surface of the beverage to a height of about 5 mm when about 11 g of the mix was reconstituted in a 250 ml beaker having 65 mm internal diameter using 130 ml of 88° C. water.

6 g of the carbohydrate-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 65%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 1.25 cc gas per gram of powder while the treated powder released about 2 cc gas per gram of powder. The powder produced a faint popping sound for a short time after depressurization. Bulk density and skeletal density of the treated powder were not measurably altered, but the increased foaming capacity indicated the force of pressurization and/or depressurization opened a portion of previously vacuous internal voids formed during particle dehydration.

Another 6 g sample of the carbohydrate-free powder was pressurized with nitrogen gas at 1000 psi, heated in a 120° C. oven for 15 minutes, and then cooled to about room temperature before depressurizing. The treatment trapped pressurized gas in the powder and produced a faint popping sound for a short time after depressurization without visible particle explosions. The treated powder had light yellow color, a tap density of 0.43 g/cc, a skeletal density of 1.28 g/cc, and an internal void volume of 7%. Replacing the untreated powder with an equal weight of treated powder in the sweetened coffee mix revealed that treatment increased the foaming capacity of the powder by over 3-fold, increasing the amount of gas released from about 1.25 cc gas per gram of powder to about 4.5 cc gas per gram of powder.

Another 6 g sample of the carbohydrate-free powder was pressurized with nitrogen gas at 1000 psi, heated in a 120° C. oven for 30 minutes, and then cooled to about room temperature before depressurizing. The treatment trapped pressurized gas in the powder and produced a faint popping sound for a short time after depressurization without visible particle explosions. The treated powder had light yellow color, a tap density of 0.44 g/cc, a skeletal density of 1.30 g/cc, and an internal void volume of 5%. Replacing the untreated powder with an equal weight of treated powder in the sweetened coffee mix revealed that treatment increased the foaming capacity of the powder by over 8-fold, increasing the amount of gas released from about 1.25 cc gas per gram of powder to about 10.5 cc gas per gram of powder.

Another 6 g sample of the carbohydrate-free powder was pressurized with nitrogen gas at 1000 psi, heated in a 120° C. oven for 60 minutes, and then cooled to about room temperature before depressurizing. The treatment trapped pressurized gas in the powder and produced a faint popping sound for a short time after depressurization without visible particle explosions. The treated powder had light yellow color, a tap density of 0.43 g/cc, a skeletal density of 1.32 g/cc, and an internal void volume of 4%. Replacing the untreated powder with an equal weight of treated powder in the sweetened coffee mix revealed that treatment increased the foaming capacity of the powder by 10-fold, increasing the amount of gas released from about 1.25 cc gas per gram of powder to about 12.5 cc gas per gram of powder. All sweetened coffee beverages had excellent clean milky flavor and odor.

EXAMPLE 3

An additional 5 g sample of the untreated carbohydrate-free powder of Example 1 was mixed with 28 g of Swiss Miss® Hot Cocoa Mix. The mix was reconstituted with 180 ml of 90° C. in a 250 ml beaker having 65 mm internal diameter to produce a hot cocoa beverage at a height of about 60 mm that was completely covered by froth at a height of about 7 mm. The untreated powder was replaced with an equal weight of another sample of the treated powder of Example 1 that was pressurized for 60 minutes at 120° C. Reconstituting the mix in the same manner produced a beverage at a height of about 60 mm that was completely covered by froth at a height of about 16 mm. The froth produced by the treated and untreated powders had creamy texture and small bubble size, but only the mix containing the treated powder produced a cracking sound when reconstituted. A continuous layer of froth at a height of only about 5 mm was produced in the hot cocoa beverage without addition of treated or untreated powder. All hot cocoa beverages had excellent flavor.

EXAMPLE 4

An additional 5 g sample of the untreated carbohydrate-free powder of Example 1 was mixed with 13 g of Lipton® Cup-a-Soup®. The mix was reconstituted with 180 ml of 90° C. water in a 250 ml beaker having 65 mm internal diameter to produce a hot soup at a height of 60 mm that was completely covered by froth at a height of about 5 mm. The untreated powder was replaced with an equal weight of another sample of the treated powder of Example 1 that was pressurized for 60 minutes at 120° C. Reconstituting the mix in the same manner produced a hot soup at a height of about 60 mm that was completely covered by froth at a height of about 15 mm. The froth produced by the treated and untreated powders had creamy texture and small bubble size, but only the mix containing the treated powder produced a cracking sound when reconstituted. No significant amount of froth was produced in the hot soup without addition of treated or untreated powder. All hot soups had excellent flavor.

EXAMPLE 5

An additional 10 g sample of the untreated carbohydrate-free powder of Example 1 was mixed with 17 g of sugar-sweetened cherry-flavored Kool-Aid® brand soft drink mix and reconstituted with 240 ml cold water in a 400 ml beaker having 72 mm internal diameter to produce a cold red beverage at a height of 65 mm that was completely covered by white froth at a height of about 5 mm. The untreated powder was replaced with an equal weight of another sample of the treated powder of Example 1 that was pressurized for 60 minutes at 120° C. Reconstituting this mix in the same manner produced a beverage at a height of about 65 mm that was completely covered by white froth at a height of about 13 mm. The froth produced by the treated and untreated powders had creamy texture and small bubble size, but only the mix containing the treated powder produced a cracking sound when reconstituted. No froth was produced in the beverage without addition of treated or untreated powder. All flavored beverages had excellent flavor.

EXAMPLE 6

An additional 5 g sample of the treated carbohydrate-free powder of Example 1 that was pressurized for 60 minutes at 120° C. was mixed with 15 g skim milk powder and 10 g sugar. The mix was reconstituted with 20 ml of 5° C. water in a 150 ml beaker having 54 mm internal diameter and stirred with a spoon to dissolve. A cold fat-free dessert topping having a thick, creamy, whipped-like, aerated texture was produced at a height of about 35 mm. The treated powder was replaced with an equal weight of anther sample of the untreated powder of Example 1. Reconstituting this mix in the same manner produced a topping with only slightly aerated texture at a height of about 25 mm. Reconstituting only the mixture of skim milk powder and sugar in the same manner produced an unappealing runny topping without aerated texture at a height of about 20 mm. In summary, the untreated powder imparted about 25% volume overrun to the topping preparation and improved the texture somewhat while the treated powder imparted about 75% volume overrun to the topping preparation and greatly improved the texture. All toppings had excellent flavor.

EXAMPLE 7

An additional 10 g sample of the untreated carbohydrate-free powder of Example 1 was mixed with 10 g of sugar and 2 g of soluble coffee powder. The mix was reconstituted with 240 ml of cold skim milk in a 400 ml beaker having 72 mm internal diameter to produce a cold cappuccino beverage at a height of about 65 mm that was completely covered by froth at a height of about 8 mm. The untreated powder was replaced with an equal weight of another sample of the treated powder of Example 1 that was pressurized for 60 minutes at 120° C. Reconstituting the mix in the same manner produced a beverage at a height of about 60 mm that was completely covered by froth at a height of about 24 mm. The froth produced by the treated and untreated powders had creamy texture and small bubble size typical of a cappuccino drink, but only the mix containing the treated powder produced a cracking sound when reconstituted. A continuous covering of froth was not produced in the cold cappuccino beverage without addition of treated or untreated powder. All cappuccino beverages had excellent flavor.

EXAMPLE 8

An additional 10 g sample of the untreated carbohydrate-free powder of Example 1 was mixed with the cheese powder provided in a package of Kraft® brand Easy Mac® macaroni and cheese dinner. Water was added to the pasta in a bowl and cooked in a microwave according to package instructions. Addition of the cheese powder mix containing the untreated powder to the pasta produced a cheese sauce having frothy texture. The untreated powder was replaced with an equal weight of another sample of the treated powder of Example 1 that was pressurized for 60 minutes at 120° C. Addition of this mix to the cooked pasta in the same manner produced a cheese sauce having very frothy texture. Only the cheese powder mix containing the treated powder produced a cracking sound when reconstituted. No significant extent of frothy texture was produced in the cheese sauce without addition of treated or untreated powder. All cheese sauces had excellent flavor.

EXAMPLE 9

An additional 10 g sample of the treated carbohydrate-free powder of Example 1 that was pressurized for 60 minutes at 120° C. was mixed with 28 g Quaker instant oatmeal. The mix was reconstituted with 120 ml 90° C. water in a 400 ml beaker having 72 mm internal diameter and stirred with a spoon to dissolve the powder. A hot cereal was produced at a height of about 40 mm that was completely covered by thick creamy froth at a height of about 13 mm. The froth was easily stirred into the cereal to create a rich, creamy, aerated texture. The froth was easily stirred into the cereal to create a slightly aerated texture. The treated powder was replaced with an equal weight of another sample of the untreated powder of Example 1. Reconstituting this mix in the same manner produced a hot cereal at a height of about 40 mm that was completely covered by froth at a height of about 3 mm. Reconstituting only the instant oatmeal in the same manner produced a hot cereal at a height of about 40 mm with no froth and without aerated texture. Only the oatmeal mix containing the treated powder produced a cracking sound when reconstituted. All hot instant cereals had excellent flavor.

COMPARISON EXAMPLE

A 50% aqueous solution of lactose and 33 DE glucose syrup solids (52% dry basis) skim milk powder (47% dry basis), and disodium phosphate (1% dry basis) was nitrogen injected and spray dried to produce a powder containing carbohydrate and protein. The powder had light yellow color, clean milky odor and flavor, a bulk density of 0.34 g/cc, a tap density of 0.40 g/cc, a skeletal density of 0.71 g/cc, an internal void volume of 52%, a true density of 1.49 g/cc, a $T_g$ of 61° C., and moisture content of about 3%. Use of the powder in an instant sweetened coffee mix according to the method of Example 2 produced an amount of froth that completely covered the surface of the beverage to a height of about 10 mm when about 11 g of the mix was reconstituted in a 250 ml beaker having 65 mm internal diameter using 130 ml of 88° C. water. The sweetened coffee mix containing the powder had a clean milky flavor.

6 g of the powder containing carbohydrate and protein was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 160%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 8.5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.75 g/cc and internal void volume decreased to 50%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Another 6 g sample of the powder containing carbohydrate and protein was pressurized with nitrogen gas at 1000 psi in a pressure vessel, heated in a 120° C. oven for 15 minutes, and then cooled to about room temperature before depressurizing. The treatment trapped pressurized gas in the powder and many particles exploded with a cracking sound for a short time after depressurization. The treated powder had light yellow color, a cooked, astringent, processed flavor, a tap density of 0.45 g/cc, a skeletal density of 0.98 g/cc, and an internal void volume of 37%. Replacing the untreated powder with an equal weight of treated powder in the sweetened coffee mix revealed that treatment increased the foaming capacity of the powder by nearly 6-fold, increasing the amount of gas released from about 3.5 cc gas per gram of powder to about 20 cc gas per gram of powder. The sweetened coffee mix containing the treated powder had an undesirable cooked, astringent, processed flavor.

Another 6 g sample of the powder containing carbohydrate and protein was pressurized with nitrogen gas at 1000 psi in a pressure vessel, heated in a 120° C. oven for 30 minutes, and then cooled to about room temperature before depressurizing.

The treatment trapped pressurized gas in the powder and a comparably larger proportion particles exploded for a short time after depressurization. The treated powder had darker yellow color, a harsh, astringent, processed flavor, a tap density of 0.44 g/cc, a skeletal density of 0.94 g/cc, and an internal void volume of 34%. Replacing the untreated powder with an equal weight of treated powder in the sweetened coffee mix revealed that treatment increased the foaming capacity of the powder by 5-fold, increasing the amount of gas released from about 3.5 cc gas per gram of powder to about 17.5 cc gas per gram of powder. The sweetened coffee mix containing the treated powder had an undesirable harsh, astringent, processed flavor.

Another 6 g sample of the powder containing carbohydrate and protein was pressurized with nitrogen gas at 1000 psi in a pressure vessel, heated in a 120° C. oven for 60 minutes, and then cooled to about room temperature before depressurizing. The treatment trapped pressurized gas in the powder and a comparably even larger proportion particles exploded with a cracking sound for a short time after depressurization. The treated powder had brown color, caramelized odor, a harsh, astringent, burnt flavor, a tap density of 0.49 g/cc, a skeletal density of 0.98 g/cc, and an internal void volume of 37%. Replacing the untreated powder with an equal weight of treated powder in the sweetened coffee mix revealed that treatment increased the foaming capacity of the powder by nearly 4-fold, increasing the amount of gas released from about 3.5 cc gas per gram of powder to about 13.5 cc gas per gram of powder. The sweetened coffee mix containing the treated powder had an undesirable harsh, astringent, burnt flavor.

Although the invention has been described in considerable detail with respect to preferred embodiments, it will be apparent that the invention is capable of numerous modifications and variations, apparent to those skilled in the art, without departing from the spirit and scope of the invention.

What is claimed is:

1. A foaming composition comprising:
    a powdered carbohydrate-free soluble composition consisting essentially of 100% hydrolyzed gelatin particles on a dry weight basis having a plurality of internal voids containing entrapped pressurized gas,
    wherein the soluble composition releases at least 5 cc of gas per gram of said composition when dissolved in a liquid at ambient conditions.

2. The foaming composition of claim 1, wherein the soluble composition releases at least 10 cc of gas per gram of said composition when dissolved in liquid at ambient conditions.

3. The foaming composition of claim 1, wherein the powdered carbohydrate-free soluble composition is soluble in a cold liquid such that 5 g of the powdered carbohydrate-free soluble composition is soluble in 20 ml of liquid at 5° C.

4. The foaming composition of claim 1, wherein the powdered carbohydrate-free composition is soluble in cold water or milk such that 10 g of the powdered carbohydrate-free soluble composition is soluble in 240 ml of water or milk.

5. The foaming composition of powdered carbohydrate-free soluble composition of claim 1, wherein the powdered carbohydrate-free soluble composition is soluble in a hot liquid such that 5 g of the powdered carbohydrate-free soluble composition is soluble in 20 ml of the liquid at least 88° C.

6. The foaming composition of claim 1, wherein said composition further comprises a buffering agent.

7. The foaming composition of claim 6, wherein said buffering agent is a salt of an organic or inorganic acid.

8. A method for manufacturing a foaming composition, said method comprising:
    heating carbohydrate-free soluble particles consisting essentially of 100% hydrolyzed gelatin on a dry weight basis and having internal voids;
    applying external pressure exceeding atmospheric pressure to the carbohydrate-free soluble particles;
    cooling the carbohydrate-free soluble particles; and
    releasing the external gas pressure thereby resulting in pressurized gas remaining in the internal voids,
    wherein the soluble composition releases at least 5 cc of gas per gram of said composition when dissolved in a liquid at ambient conditions.

9. The method of claim 8, wherein said applying external pressure is conducted prior to heating the particles.

10. The method of claim 9, wherein said applying external pressure is conducted while applying heat to the particles.

11. The method of claim 8, further comprising spray drying an aqueous solution containing the protein to form the carbohydrate-free soluble particles.

12. The method of claim 11, wherein said spray drying comprises injecting gas into the aqueous solution.

13. The method of claim 11, wherein said spray drying is conducted without injecting gas into the aqueous solution.

14. A foaming composition, comprising:
    carbohydrate-free soluble foaming particles comprising 100% hydrolyzed gelatin on a dry-weight basis and having a plurality of internal voids containing entrapped pressurized gas, said particles formed from subjecting said particles to an external gas pressure exceeding atmospheric pressure prior to or while heating said particles to a temperature of at least the glass transition temperature and then cooling said particles to a temperature below said glass transition temperature prior to or while releasing said external gas pressure in a manner effective to trap said pressurized gas within said internal voids,
    wherein the soluble composition releases at least 5 cc of gas per gram of said composition when dissolved in liquid at ambient conditions.

15. A foaming composition comprising:
    a powdered carbohydrate-free soluble composition consisting essentially of 100% hydrolyzed gelatin particles on a dry weight basis having a plurality of internal voids containing entrapped atmospheric pressure gas, wherein said entrapped atmospheric pressure gas is released from the internal voids upon dissolving the hydrolyzed gelatin particles in a liquid to thereby produce foam.

* * * * *